United States Patent Office 3,110,856
Patented Nov. 12, 1963

3,110,856
SEMICONDUCTOR FAULT DETECTING
TRIP CIRCUIT
Willard S. Albert, Trafford, Pa., assignor to Westinghouse Electric Corporation, East Pittsburgh, Pa., a corporation of Pennsylvania
Filed Dec. 22, 1960, Ser. No. 77,586
7 Claims. (Cl. 321—14)

This invention relates to improvements in controlled rectifier equipment, and more particularly to protection means for controlled semiconductor rectifier equipment.

It is an object of this invention to provide a protection system for controlled semiconductor rectifying equipment.

Another object of this invention is to provide a fault detecting trip circuit for controlled semiconductor rectifier equipment that is self-protecting.

Another object of this invention is to provide means of connecting a plurality of phases of a controlled semiconductor rectifier equipment so that a single control device may effect a change in all phases.

Figure 1A:
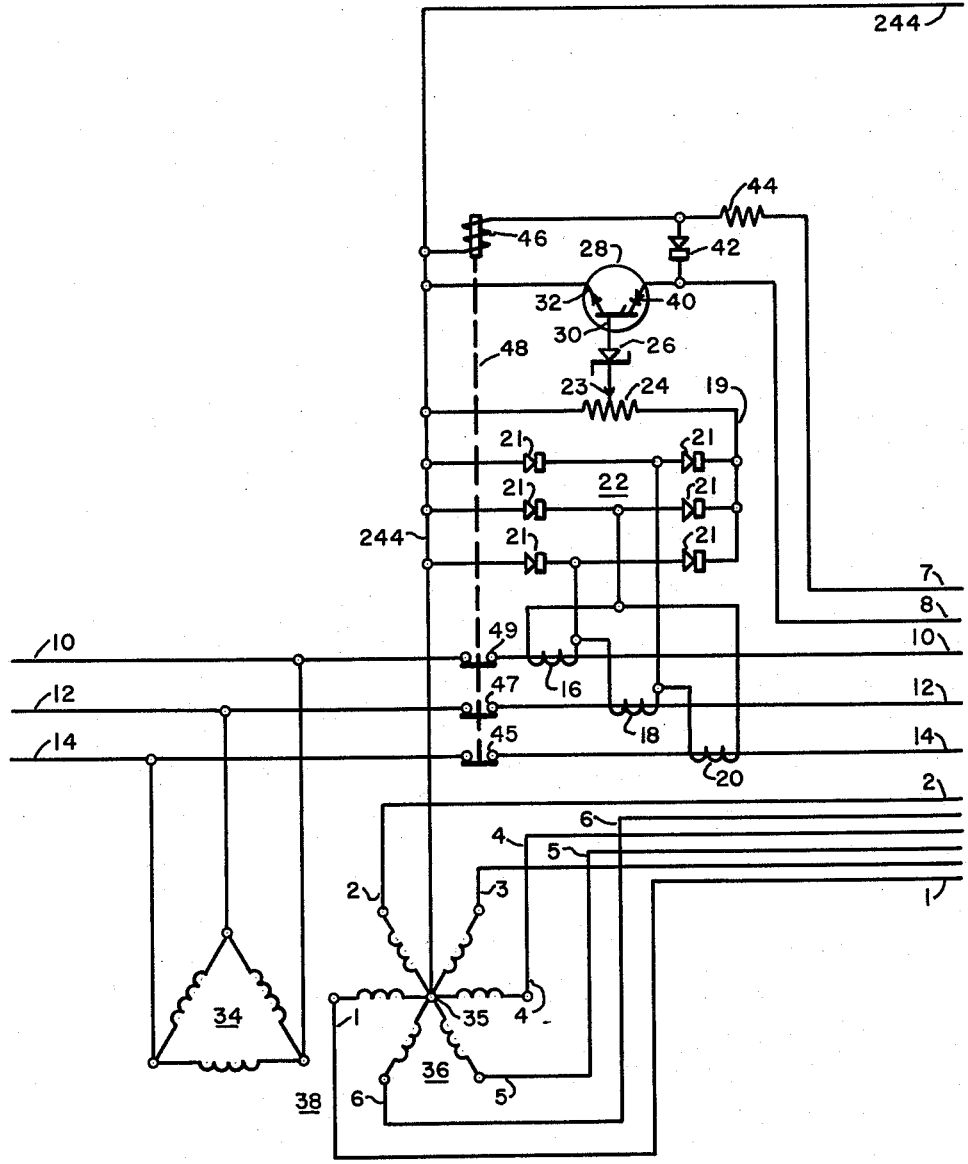
Figure 1B:
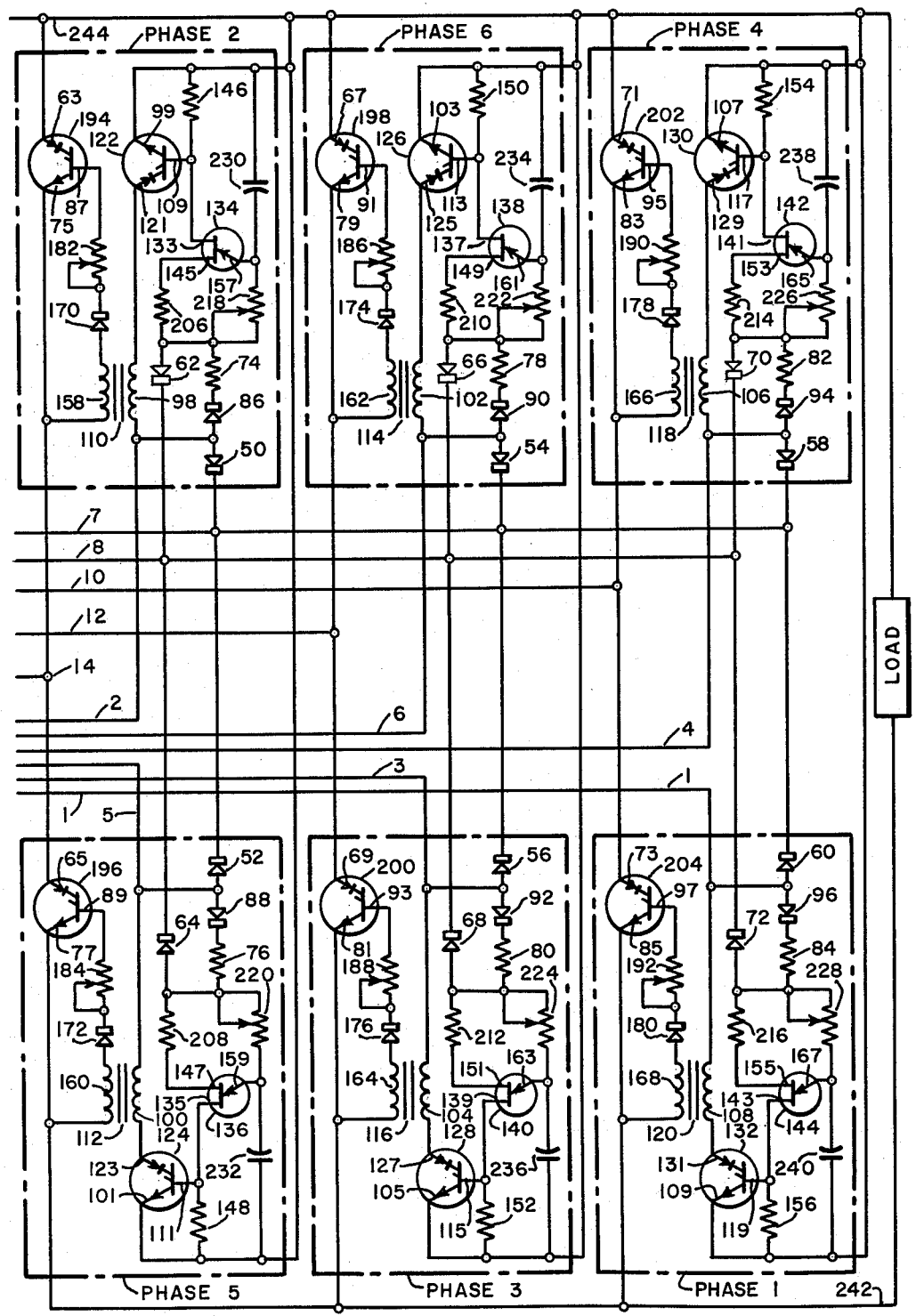

Other objects and advantages of this invention will become apparent from the following description taken in conjunction with the drawings in which:

FIG. 1A is a schematic diagram of a fault detection circuit and a multi-phase transformer for furnishing energy to a firing circuit; and, FIG. 1B is a schematic diagram of a six phase controlled silicon rectifier which is connected to the circuit of FIG. 1A by the conductors having the same reference numbers as the like conductors of FIG. 1A.

Referring to FIG. 1A, three current transformers 16, 18 and 20 detect a load current carried by three leads 10, 12 and 14 respectively of a three phase alternating current input to the rectifier equipment. The current transformers 16, 18 and 20 supply a signal to a bridge rectifier 22 proportional to the current in the alternating current leads 10, 12 and 14. The bridge rectifier 22 comprises six identical semiconductor diodes 21 connected as shown in FIG. 1A. The direct current output of the bridge rectifier 22 is connected by means of conductors 19 and 244 across a variable resistor 24. The resistor 24 functions as a voltage divider. A sliding contact 23 of the variable resistor 24 is connected through a Zener diode 26 to a control electrode 30 of a semiconductor controlled rectifier 28. The controlled rectifier 28 also comprises a cathode 32 and an anode 40. The cathode 32 of the controlled rectifier 28 is connected by the conductor 244 to a common center tap 35 of six identical secondary windings 36 of a transformer 38.

The transformer 38 has a three phase delta connected primary 34 connected to the alternating current input leads 10, 12 and 14. The secondary windings 36 of the transformer 38 are connected in a balanced six phase star connection to thereby provide six phases, numbered 1, 2, 3, 4, 5 and 6.

The anode 40 of the controlled rectifier 28 is connected to a cathode of a diode 42. An anode of the diode 42 is connected to one end of a resistor 44, and through a holding coil 46 of a circuit breaker 48 to the common center tap 35 of the secondary windings 36 of the transformer 38.

Another end of the resistor 44 is connected by a conductor 7 to a junction point common to all six cathodes of a plurality of diodes 50, 52, 54, 56, 58 and 60 shown in FIG. 1B in phases, 2, 5, 6, 3, 4 and 1, respectively. Each of the six diodes 50, 52, 54, 56, 58 and 60 has an anode connected to a different winding of the six secondary windings 36 of the transformer 38. This manner of connecting the balanced six phase secondary 36 and the diodes 50, 52, 54, 56, 58 and 60 provides a direct current voltage to be divided between the resistor 44 and the holding coil 46 thereby maintaining the circuit breaker 48, contacts 45, 47 and 49 in the closed position.

The anode 40 of the controlled rectifier 28 is connected by a conductor 8 to a junction point common to all six cathodes of a plurality of diodes 62, 64, 66, 68, 70 and 72 shown in FIG. 1B. Each of the six diodes 62, 64, 66, 68, 70 and 72 has an anode connected to one end of a plurality of resistors 74, 76, 78, 80, 82 and 84, respectively. Another end of each of the resistors 74, 76, 78, 80, 82 and 84 is connected to the cathodes of a plurality of diodes 86, 88, 90, 92, 94 and 96, respectively. Each anode of the diodes 86, 88, 90, 92, 94 and 96 is connected to one of the six windings of the balanced six phase secondary windings 36 of the transformer 38. The six secondary windings 36 of the transformer 38 in cooperation with the six diodes 86, 88, 90, 92, 94 and 96, six resistors 74, 76, 78, 80, 82 and 84, and six diodes 62, 64, 66, 68, 70 and 72 provides a direct current to the anode 40 of control rectifier 28.

The anodes of the diodes 86, 88, 90, 92, 94 and 96 are also connected to one end of a plurality of primary windings 98, 100, 102, 104, 106 and 108, respectively of a plurality of transformers 110, 112, 114, 116, 118 and 120, respectively. Another end of the primary windings 98, 100, 102, 104, 106 and 108 of the transformers 110, 112, 114, 116, 118 and 120, respectively is connected to the anodes 121, 123, 125, 127, 129 and 131, respectively of a plurality of controlled rectifiers 122, 124, 126, 128, 130 and 132, respectively.

The control electrodes 109, 111, 113, 115, 117 and 119 of the controlled rectifiers 122, 124, 126, 128, 130 and 132, respectively, are connected to a base 133, 135, 137, 139, 141 and 143, respectively of a plurality of double base diodes or unijunction transistors 134, 136, 138, 140, 142 and 144, respectively; and through a plurality of resistors 146, 148, 150, 152, 154 and 156, respectively by the conductor 244 to the common center tap 35 of the secondary windings 36 of the transformer 38. Unijunction transistors 134, 136, 138, 140, 142 and 144 have another base 145, 147, 149, 151, 153 and 155, respectively connected through a plurality of resistors 206, 208, 210, 212, 214 and 216, respectively to the anodes of the diodes 62, 64, 66, 68, 70 and 72, respectively. The emitters 157, 159, 161, 163, 165 and 167 of the unijunction transistors 134, 136, 138, 140, 142 and 144, respectively are connected through a plurality of variable resistors 218, 220, 222, 224, 226 and 228, respectively to the anodes of the diodes 62, 64, 66, 68, 70 and 72, respectively; and through a plurality of capacitors 230, 232, 234, 236, 238 and 240, respectively by the conductor 244 to the center tap 35 of the secondary windings 36 of the transformer 38. The cathodes 99, 101, 103, 105, 107 and 109 of the controlled rectifiers 122, 124, 126, 128, 130 and 132 are connected by conductor 244 to the center tap 35 of the secondary windings 36 of the transformer 38.

A series circuit comprising a plurality of secondary windings 158, 160, 162, 164, 166 and 168 of the transformers 110, 112, 114, 116, 118 and 120, respectively, a plurality of diodes 170, 172, 174, 176, 178 and 180, respectively, and a plurality of variable resistors 182, 184, 186, 188, 190 and 192, respectively, is connected from the control electrodes 87, 89, 91, 93, 95 and 97 of a plurality of silicon controlled power rectifiers 194, 196, 198, 200, 202 and 204, respectively to the cathodes 75, 77, 79, 81, 83 and 85 respectively of said plurality of controlled power rectifiers 194, 196, 198, 200, 202 and 204, respectively. The anodes 63, 67 and 71 of the rectifiers 194, 198 and 202 are connected to a negative direct current output lead 244, and the cathodes 75, 79 and 83 of said rectifiers 194, 198 and 202 are connected to the alternating current input leads 14, 12 and 10, respectively. The cathodes 77, 81 and 85 of the rectifiers 196, 200 and 204 are connected to a positive direct current output lead 242, and the anodes 65, 69 and 73 of the rectifiers 196, 200 and 204 are connected to the alternating current input leads 14, 12 and 10, respectively.

During normal operation of the rectifier equipment the plurality of diodes 86, 88, 90, 92, 94 and 96, and the plurality of resistors 74, 76, 78, 80, 82 and 84, in cooperation with the secondary windings 36 of the transformer 38 supply energy to the unijunction transistors 134, 136, 138, 140, 142 and 144, respectively in such a manner as to cause said transistors 134, 136, 138, 140, 142 and 144 to conduct in a predetermined sequence. Conduction of the controlled rectifiers 122, 124, 126, 128, 130 and 132 starts when a pulse, of the desired phase relationship with respect to the alternating current input as determined by the value of the variable resistors 218, 220, 222, 224, 226 and 228 and the capacitors 230, 232, 234, 236, 238 and 240, respectively, is applied to the control electrode 109, 111, 113, 115, 117 and 119 of said controlled rectifiers 122, 124, 126, 128, 130 and 132, respectively, by the conduction of said unijunction transistors 134, 136, 138, 140, 142 and 144, respectively. Conduction of the controlled rectifiers 122, 124, 126, 128, 130 and 132 causes a current flow through the primary windings 98, 100, 102, 104, 106 and 108, respectively of the transformers 110, 112, 114, 116, 118 and 120 for a period of sixty degrees or more to thereby fulfill the requirements necessary to start conduction of a double way rectifier circuit.

This current flow in the primary windings 98, 100, 102, 104, 106 and 108 is magnetically coupled to the respective secondary winding 158, 160, 162, 164, 166 and 168 of the transformers 110, 112, 114, 116, 118 and 120 to thereby supply a firing signal to the power controlled rectifiers 194, 196, 198, 200, 202 and 204, respectively. Said power controlled rectifiers 194, 196, 198, 200, 202 and 204 continue to conduct until the anode potential decreases to a value smaller in magnitude than the cathode potential. The controlled rectifiers 194, 196, 198, 200, 202 and 204 having returned to a blocked or non-conducting state within one-half of one cycle of the alternating current input requires the application of the firing signal to start conduction again on the next cycle.

The current transformers 16, 18 and 20 in conjunction with the bridge rectifier 22 and the preset variable resistor 24, due to a current in the alternating current input leads 10, 12 and 14 in excess of some predetermined value, causes the blocking rating of the Zener diode 26 to be exceeded and a firing signal is thereby provided to the control electrode 30 of the controlled rectifier 28. The firing signal to the control electrode 30 of the controlled rectifier 28 starts the conduction of said rectifier 28 thereby changing said rectifier 28 from a high impedance element to a low impedance element. As a low impedance element the controlled rectifier 28 short circuits the variable resistors 218, 220, 222, 224, 226 and 228 and capacitors 230, 232, 234, 236, 238 and 240 respectively to the common center tap 35 of the secondary windings 36 of the transformer 38 thereby preventing the application of the firing signal to the power controlled rectifiers 194, 196, 198, 200, 202 and 204. The interruption of the firing signal to the power controlled rectifiers 194, 196, 198, 200, 202 and 204 will, within one-half of one cycle of the alternating current input, cause all six phases to remain in a non-conducting or blocked state.

The low impedance of the conducting controlled rectifier 28 also appears across the holding coil 46 to thereby short circuit the direct current to said coil 46 through the diode 42 and the low impedance of the conducting controlled rectifier 28 to thereby cause circuit breaker 48 to open contacts 45, 47 and 49.

The circuit described herein is self-protecting to the extent that a failure of the Zener diode 26 or the controlled rectifier 28 will cause all six phases of the rectifier unit to cease conduction and cause the circuit breaker 48 to open contacts 45, 47 and 49.

It is to be understood that the above description of a protection device is not to be taken as limited to six phases as described and shown in the drawings, but will protect as many or as few phases as is required.

Since numerous changes may be made in the above described apparatus and other embodiments of the invention may be made without departing from the spirit and scope thereof, it is intended that all the matter in the foregoing description or shown on the accompanying drawings shall be interpreted as illustrative and not in a limiting sense.

I claim as my invention:

1. Apparatus for protecting a plurality of controlled silicon rectifiers connected to supply a direct current load from an alternating current source and having a conducting and a non-conducting state controlled by the application of a plurality of impulse firing signals; said apparatus comprising a circuit interrupter for disconnecting the rectifiers from said alternating current source, alternating current detection means responsive to the current from said source, rectifier means for converting alternating current from said alternating current detection means to direct current, load means connected to said rectifier means to be energized by said direct current, voltage sensitive static switching means having a conducting and a non-conducting state controlled by the voltage across said load means, said voltage sensitive static switching means being made conducting by said voltage to render said controlled silicon rectifiers non-conducting by preventing the application of said impulse firing signals and to cause the opening of said circuit interrupter.

2. Apparatus for protecting a plurality of controlled silcon rectifiers connected to supply a direct current load from an alternating current source and having a conducting and a non-conducting state controlled by the application of a plurality of impulse firing signals; said apparatus comprising a circuit interrupter for disconnecting the rectifiers from said alternating current source, a plurality of alternating current transformers magnetically coupled to the alternating current source rectifier means for converting alternating current from said alternating current transformers to direct current, a load resistor connected to said rectifier means to be energized by said direct current, voltage sensitive static switching means having a conducting and a non-conducting state controlled by the voltage across said load resistor, said voltage sensitive static switching means being made conducting by said voltage to render said plurality of controlled silicon rectifiers non-conducting by preventing the application of said impulse firing signals and to cause the opening of said circuit interrupter.

3. Apparatus for protecting a plurality of controlled silcon rectifiers connected to supply a direct current load from an alternating current source and having a conducting and a non-conducting state controlled by the application of a plurality of impulse firing signals; said apparatus comprising a circuit interrupter for disconnecting the rectifiers from said alternating current source, alternating current detection means responsive to the current from said source, rectifier means for converting alternating current from said alternating current detection means to direct current, load means connected to said rectifier means to be energized by said direct current, a Zener diode having a conducting and a non-conducting state controlled by the voltage across said load means, said Zener diode being made conducting by said voltage to render said plurality of controlled silicon rectifiers non-conducting by preventing the application of said impulse firing signals and to cause the opening of said circuit interrupter.

4. Apparatus for protecting a plurality of controlled silicon rectifiers connected to supply a direct current load from an alternating current source and having a conducting and a non-conducting state controlled by the application of a plurality of impulse firing signals; said apparatus comprising a circuit interrupter for disconnecting the rectifiers from said alternating current source, alternating current detection means responsive to the current from said source, rectifier means for converting alternating current from said alternating current detection device to direct current, load means connected to said rectifier means to be energized by said direct current, voltage sensitive static switching means having a conducting and a non-conducting state controlled by the voltage across said load means, another controlled rectifier having a conducting and a non-conducting state, said voltage sensitive static switching means functioning when conducting to render said another controlled rectifier conducting, said another controlled rectifier functioning when conducting to render said plurality of controlled silcon rectifiers non-conducting by preventing the application of said impulse firing signals and to cause the opening of said circuit interrupter.

5. In apparatus for supplying high power direct current to a load from an alternating current supply, in combination, a plurality of controlled silicon rectifiers connected to energize said load from said supply and having a conducting and a non-conducting state, a plurality of impulse firing circuits for controlling the state of said rectifiers, each of said firing circuits comprising a controlled static switching device having a conducting and a non-conducting state and a unijunction transistor having a conducting and a non-conducting state, said unijunction transistor when conducting supplying a pulse to render said controlled static switching device conducting, said controlled static switching device when conducting being operable to start conduction of said controlled silicon rectifier, an alternating current detection means responsive to the current from said supply, rectifier means for converting alternating current from said alternating current detection means to direct current, load means connected to said rectifier means to be energized by the direct current, voltage sensitive static switching means having a conducting and a non-conducting state controlled by the voltage across said load means, said voltage sensitive static switching means being made conducting by said voltage to render said plurality of controlled rectifiers non-conducting by preventing the functioning of said firing circuits.

6. In apparatus for supplying high power direct current to a load from an alternating current supply, in combination, a plurality of controlled silicon rectifiers having a conducting and a non-conducting state, an alternating current supply circuit breaker having a holding coil, a plurality of impulse firing circuits, each of said firing circuits comprising a controlled static switching device having a conducting and a non-conducting state, a transformer, and a unijunction transistor having a conducting and a non-conducting state, said unijunction transistor when conducting supplying a pulse rendering said controlled switching static device conducting, said controlled switching static device when conducting providing a signal through said transformer to start conduction of said controlled silicon rectifiers, a plurality of alternating current transformers magnetically coupled to the alternating current supply, a three-phase bridge rectifier converting the alternating current from said alternating current transformers to direct current, a load resistor having an adjustable contact, said load resistor being energized by said bridge rectifier, a Zener diode connected to said adjustable contact, said Zener diode having a conducting and a non-conducting state controlled by the voltage of said contact, another controlled rectifier having a conducting and a non-conducting state, said Zener diode being operable when conducting to render said another controlled rectifier conducting, said another controlled rectifier being operable when conducting to short circuit said impulse firing circuit and simultaneously short circuit the holding coil for said alternating current supply circuit breaker to render said controlled silicon rectifiers non-conducting.

7. In apparatus for supplying high power direct current to a load from an alternating current source, in combination, a plurality of controlled silicon rectifiers having a conducting and a non-conducting state, a plurality of impulse firing circuits to control the state of said plurality of controlled rectifiers, alternating current detection means responsive to the current from said source, rectifier means for converting alternating current from said detection means to direct current, load means connected to said rectifier means to be energized by said direct current, voltage sensitive static switching means having a conducting and a non-conducting state controlled by the voltage across said load means, another controlled rectifier means having a conducting and a non-conducting state, said voltage sensitive static switching means functioning when conducting to render said another controlled rectifier means conducting, said another controlled rectifier means functioning when conducting to interrupt said plurality of firing circuits to thereby render said plurality of controlled rectifiers non-conducting, a diode, said another controlled rectifier means when conducting also cooperating with said diode to disconnect said controlled silicon rectifiers from said alternating current source.

References Cited in the file of this patent

UNITED STATES PATENTS

| | | |
|---|---|---|
| 2,222,696 | Alexanderson | Nov. 26, 1940 |
| 2,354,158 | Taliaferro | July 18, 1944 |
| 2,684,460 | Busemann | July 20, 1954 |
| 2,875,382 | Sandin et al. | Feb. 24, 1959 |